(12) United States Patent
Tenner et al.

(10) Patent No.: US 10,725,660 B2
(45) Date of Patent: Jul. 28, 2020

(54) POLICY-BASED OPTIMIZATION OF CLOUD RESOURCES ON TIERED STORAGE OPERATIONS

(71) Applicant: International Business Machines Corporation, Armonk, NY (US)

(72) Inventors: Jeffrey W. Tenner, Rochester, MN (US); Gerald McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/815,965

(22) Filed: Nov. 17, 2017

(65) Prior Publication Data
US 2019/0155512 A1 May 23, 2019

(51) Int. Cl.
*G06F 12/00* (2006.01)
*G06F 3/06* (2006.01)
*G06F 9/50* (2006.01)
*H04L 29/08* (2006.01)

(52) U.S. Cl.
CPC .......... *G06F 3/0608* (2013.01); *G06F 3/0647* (2013.01); *G06F 9/5016* (2013.01); *G06F 9/5077* (2013.01); *G06F 12/00* (2013.01); *H04L 67/1097* (2013.01); *G06F 3/061* (2013.01)

(58) Field of Classification Search
CPC ...................................................... G06F 12/00
USPC ......................................................... 711/165
See application file for complete search history.

(56) References Cited

U.S. PATENT DOCUMENTS

| | | | | |
|---|---|---|---|---|
| 7,529,903 | B2* | 5/2009 | Boss | ...................... G06F 3/0605 |
| | | | | 711/165 |
| 7,702,779 | B1* | 4/2010 | Gupta | ........................ G06F 9/50 |
| | | | | 709/220 |
| 8,713,163 | B2 | 4/2014 | Teather | |
| 9,298,373 | B2 | 3/2016 | Powers et al. | |
| 9,477,427 | B2 | 10/2016 | Antony et al. | |

(Continued)

FOREIGN PATENT DOCUMENTS

CN 105808262 A 7/2016

OTHER PUBLICATIONS

Glassborow, "Automated storage tiering product comparison," Computer Weekly.com, Printed Nov. 15, 2017, 7 pages, http://www.computerweekly.com/feature/Automated-storage-tiering-product-comparison.

(Continued)

*Primary Examiner* — Gautam Sain
(74) *Attorney, Agent, or Firm* — Alex Harvey

(57) ABSTRACT

A method for enabling management of cloud resources based on tiered storage data movement includes receiving a request from a cloud computing system to provide the cloud computing system a notification of a data movement initiated by a tiered storage system, where the data movement comprises moving data associated with the cloud computing system from a first storage tier to a second storage tier, and the notification comprises an indication of a condition for initiating the data movement. The method then includes determining that a condition for initiating the data movement was satisfied. The method further includes initiating the data movement in response to determining that the condition was satisfied. The method additionally includes transmitting the notification in response to initiating the data movement.

18 Claims, 8 Drawing Sheets

(56) References Cited

U.S. PATENT DOCUMENTS

| | | | |
|---|---|---|---|
| 9,880,738 B2 | 1/2018 | Powers et al. | |
| 2007/0011420 A1 | 1/2007 | Boss et al. | |
| 2009/0198814 A1 | 8/2009 | Oono et al. | |
| 2012/0072579 A1 | 3/2012 | Teather | |
| 2013/0297903 A1* | 11/2013 | Kaneko | G06F 3/0605 |
| | | | 711/165 |
| 2013/0346688 A1* | 12/2013 | Hayakawa | G06F 3/0611 |
| | | | 711/113 |
| 2014/0032872 A1 | 1/2014 | Vasavi et al. | |
| 2015/0199131 A1 | 7/2015 | Powers et al. | |
| 2016/0054922 A1 | 2/2016 | Awasthi et al. | |
| 2016/0085481 A1 | 3/2016 | Antony et al. | |
| 2016/0162195 A1 | 6/2016 | Powers et al. | |
| 2017/0160983 A1 | 6/2017 | Fiske et al. | |
| 2018/0024867 A1* | 1/2018 | Gilsdorf | G06F 3/0613 |
| | | | 709/226 |
| 2018/0107393 A1 | 4/2018 | Powers et al. | |

OTHER PUBLICATIONS

Mell, et al., "The NIST Definition of Cloud Computing," Recommendations of the National Institute of Standards and Technology, U.S. Department of Commerce, NIST Special Publication 800-145, Sep. 2011, 7 pages.

Tenner, et al., "Policy-Based Optimization of Cloud Resources on Tiered Storage Operations," U.S. Appl. No. 15/815,947, filed Nov. 17, 2017.

List of IBM Patents or Patent Applications Treated as Related, dated Nov. 17, 2017, 2 pages.

* cited by examiner

POLICY-BASED OPTIMIZATION OF CLOUD RESOURCES ON TIERED STORAGE OPERATIONS

BACKGROUND

The present disclosure relates to cloud computing, and more specifically, to management of cloud resources based on tiered storage data movement.

Cloud computing enables ubiquitous access to shared pools of configurable resources (e.g., computer networks, servers, storage, applications and services), which can be rapidly, and programmatically, provisioned over a network. Computing systems that provide cloud computing services can use automated storage tiering to manage data storage in the cloud computing system. Automated storage tiering is a storage management capability to move data between different storage types (e.g., storage tiers) to optimize storage allocation with respect to, for example, cost, performance, and storage space.

SUMMARY

According to embodiments of the present disclosure, a method for enabling management of cloud resources based on tiered storage data movement includes receiving a request from a cloud computing system to provide the cloud computing system a notification of a data movement initiated by a tiered storage system, where the data movement comprises moving data associated with the cloud computing system from a first storage tier to a second storage tier, and the notification comprises an indication of a condition for initiating the data movement. The method then includes determining that a condition for initiating the data movement was satisfied. The method further includes initiating the data movement in response to determining that the condition was satisfied. The method additionally includes transmitting the notification in response to initiating the data movement.

Other embodiments are directed to systems and computer program products for implementing the methods described herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
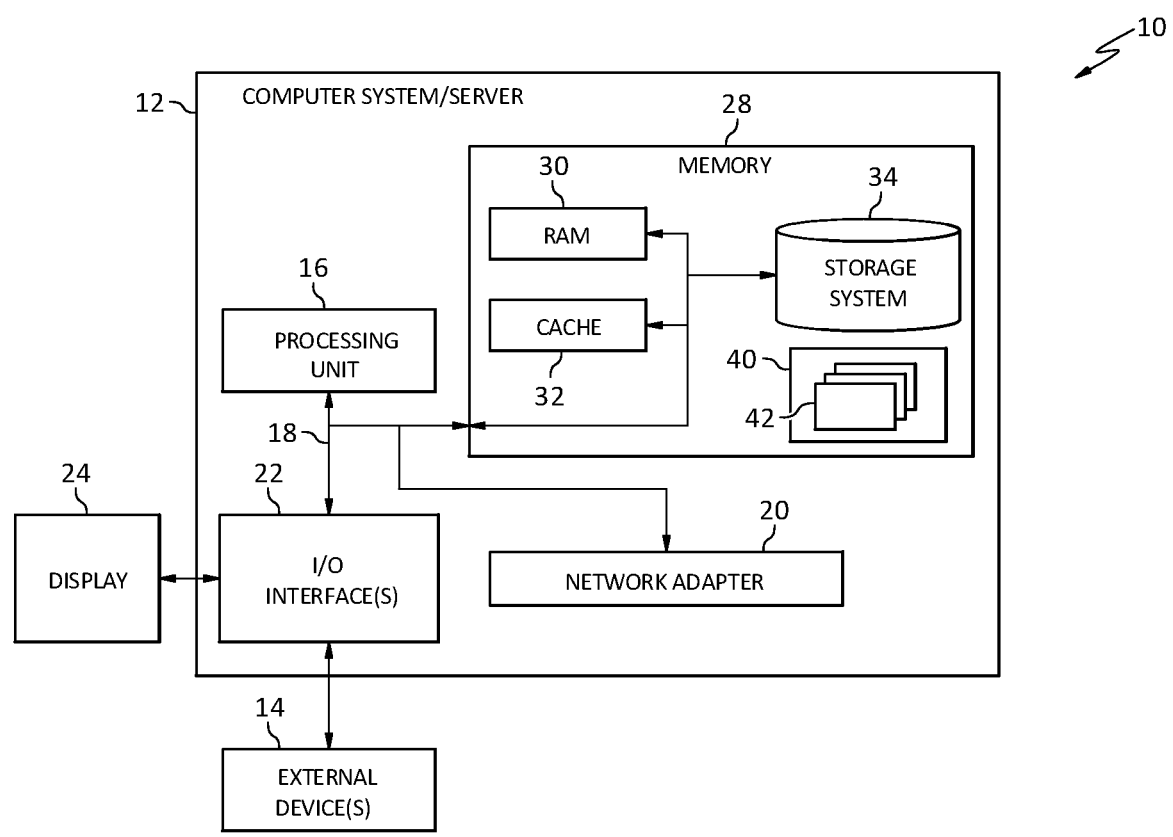
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cloud computing, more particular aspects relate to management of cloud resources based on tiered storage data movement. While the present disclosure is not necessarily limited to such applications, various aspects of the disclosure may be appreciated through a discussion of various examples using this context.

Cloud computing systems can utilize tiered storage systems to store blocks of data embodying logical volumes managed by the cloud computing systems. The blocks of data can represent a portion of, or the entire, a logical storage volume of a cloud computing system. A cloud computing system's logical storage volume can be partitioned into two more virtual volumes allocated to computing environments hosted by the cloud computing system. While cloud computing systems are aware of the mapping between virtual volumes of hosted computing environments and blocks of a logical volume of a cloud computing system, tiered storage systems generally do not have access to this information.

Tiered storage systems, as part of their tiered storage management charge, can, automatically (e.g., on their own) initiate data movements to move or relocate blocks data associated a logical volume of a cloud computing system from a first storage tier to a second storage tier. The tiered storage system can have conditions (e.g., reasons or triggering events) for initiating a data movement. Examples of a condition is the usage of the first storage tier exceeding a threshold usage, and available storage capacity on the first storage tier falling below a threshold capacity. While tiered storage systems are typically aware of cross-tier data movements and the reasons for initiating the data movements, cloud computing systems affected by the movements generally do not have access to this information.

The information disconnection between reasons behind data movements initiated by a tiered storage system and information regarding which hosted computing environment has have virtual volumes affected by these data movements can result in a suboptimal utilization of computing resources in cloud computing systems.

Embodiments of this disclosure are based on the recognition that utilization of computing resources in a cloud computing system can be improved by enabling a tiered storage system to transmit to a cloud computing system, and by configuring a cloud system to request and use, information about the reason that a tiered storage system moves one or more blocks of data associated with the could computing system from a first storage tier to a second storage tier. The cloud computing system can use this information to manage the allocation of resources provisioned to hosted computing environments to improve resource utilization. For example, a data movement to a slower storage tier (e.g., a storage tier having, for example, lower read/write throughput than a current storage tier) can result in a decrease in transactions being processed for a hosted computing environment having a virtual volume associated with the data movement. As an example, a cloud computing system can use information indicating that a specific block was moved to a slower tier to, for example, reduce memory or processor resources allocated to hosted computing environment having a virtual volume associated with the relocated block. In another example, when a data movement moves a block from a slow storage tier to a faster storage tier, the cloud computing system can use information about this data movement to move a hosted computing environment whose virtual volume is associated with the data movement to a faster processor or system bus.

Accordingly, embodiments of the present disclosure are directed to a technique (e.g., methods, systems, and computer program products) to enable management of cloud resources based on tiered storage data movement. The technique can be executed by a tiered storage system to receive a request from a cloud computing system to provide the cloud computing system a notification of a data movement initiated by a tiered storage system. A data movement includes moving data associated with the cloud computing system from a first storage tier to a second storage tier. In some embodiments, the notification includes an indication of a condition (e.g., a reason or triggering event) for initiating (e.g., starting and executing) the data movement. The technique can be further executed by the tiered storage system to determine that a condition for initiating the data movement even was satisfied, and to initiate the data movement in response to the determining. The tiered storage system can then transmit the notification to the cloud computing system in response to initiating the data movement.

In some embodiments, the first storage tier (e.g., the source of a data movement) has a performance level that is different from a performance level of the second storage tier (e.g., the destination of the data movement).

In some embodiments, the request received from the cloud computing system includes a criteria for causing the tiered storage system to provide the notification. In these embodiments, the notification is transmitted in response to determining that the criteria is satisfied. The criteria can be based on at least one of the data movement direction and the condition for initiating the data movement. The criteria can also be based on aggregate characteristics of a set (e.g., one or more) of data movements initiated by the tiered storage system. The aggregate characteristics can, for example, be a frequency of data movements from a storage tier having a first performance level to a storage tier having a second performance level, where the second performance level is lower than the first performance level. Another example of an aggregate characteristics is a frequency of data movements from a storage tier in response to determining that the storage tier having insufficient storage capacity.

In some embodiments, the data associated with the cloud computing system can be one or more blocks of data embodying a virtual volume associated with a hosted computing environment.

In certain embodiments, a condition for initiating a data movement can be at least one of an input/output resource utilization of a storage tier reaching a threshold utilization level, an amount of data associated with the cloud computing system reaching or exceeding a threshold amount, and an amount of data stored on the first tier reaching a threshold amount. Other criteria are possible.

Other embodiments of the present disclosure are directed to a technique (e.g., methods, systems, and computer program products) for allocating cloud resources in a cloud computing system based on data movement by a tiered storage system. The technique can be executed by a cloud computing system to, for example, improve utilization of clouding computing resources in response to data movements initiated by a tiered storage system. The technique includes transmitting a request to a tiered storage system to provide a notification of a data movement initiated by a tiered storage system. The data movement can include moving data associated with the cloud computing system from a first storage tier to a second storage tier. The notification can include an indication of a condition for initiating the data movement. The technique can further include receiving the notification from the tiered storage system. The technique can then include identifying, using the received notification, a hosted computing environment having a volume (e.g., a virtual volume) associated with the data movement. The technique can then include determining whether to change an allocation of resources to the identified hosted computing environment. The technique can further include changing the allocation of resources response to determining to change the allocation of resources to the hosted computing environment.

In some embodiments, the request transmitted to the tiered storage system includes a criteria for providing the notification. The criteria, for example, can be based on whether a storage tier that is a source of a data movement has a performance better than a performance of a storage tier that is a destination of the data movement. The criteria can also be based on at least one of the data movement direction and the condition for initiating the data movement. The criteria can further be based on aggregate characteristics of a set (e.g., one or more) of data movements initiated by the tiered storage system. The aggregate characteristics can be a frequency, or count, of data movements from a storage tier having a first performance level to a storage tier having a second performance level, where the second performance level is lower than the first performance level. The aggregate characteristics can also be a frequency, or count, of data movements from a storage tier in response to determining that the storage tier has insufficient storage capacity. The aggregate characteristics can additionally be a data movement including data associated with a set of hosted computing environments (e.g., virtual volumes of the set of hosted computing environments) from a first storage system to a second storage system.

In some embodiments, the resources allocated in the cloud computing system can include memory, processors, and communication bandwidth allocated to a hosted computing environment.

In some embodiments, changing the allocation of resources includes moving the hosted computing environment from a first host computing system to a second host computing system. In some embodiments, changing the allocation of resources includes suspending execution of the hosted computing environment. In certain embodiments, changing the allocation of resources includes notifying a user associated with the hosted computing environment to cause the user to change the allocation of resources to the hosted computing environment. In other embodiments, changing the allocation of resources includes notifying a service associated with the hosted computing environment to cause the server to change the allocation of resources.

As used herein, the term cloud computing system includes computing systems (e.g., host computing systems) and applications configured to enable access to shared pools of configurable resources (e.g., computer networks, servers, storage, applications and services). A cloud computing system can support or hosted computing environments (e.g., a virtual machines) on top of a layer of software and firmware that provides an abstraction of the hardware associated with the cloud computing system. The operations of a cloud computing system can be managed (e.g., regulated and executed) by one or more software applications (hereinafter, "cloud manager").

As used herein, a logical volume is an abstraction of the storage space on one or more storage volumes (e.g., physical extends of a storage volume) into a virtual disk or a virtual disk partition that can appear to a computing environment as a single continuous storage area. A tiered storage system, for example, can provide one or more logical volumes to a cloud computing system. A cloud computing system can partition its logical volumes into one or more virtual volumes which can be allocated to hosted computing environments.

While the logical volume can appear as single volume of storage to a cloud computing system, the logical volume is seen, form a perspective of a tiered storage system, as a set of blocks allocated to the cloud computing system. A tiered storage system is typically not aware the virtual volume partitions of the logical volume. In some environments, the tiered storage system is not aware of the structure of the logical volume. Similarly, the cloud computing system may not be aware of the management operations (e.g., data movements between tiers and triggering events and conditions that initiate the data movements) performed on blocks of its logical volume.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
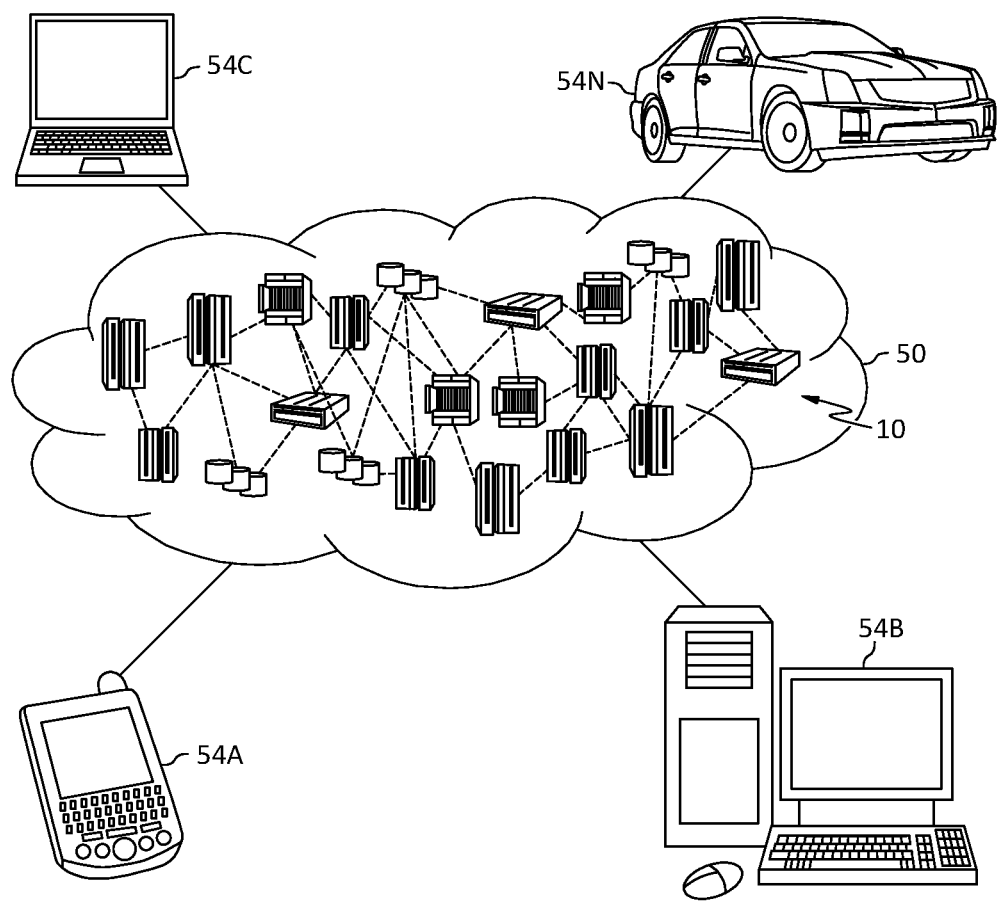
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
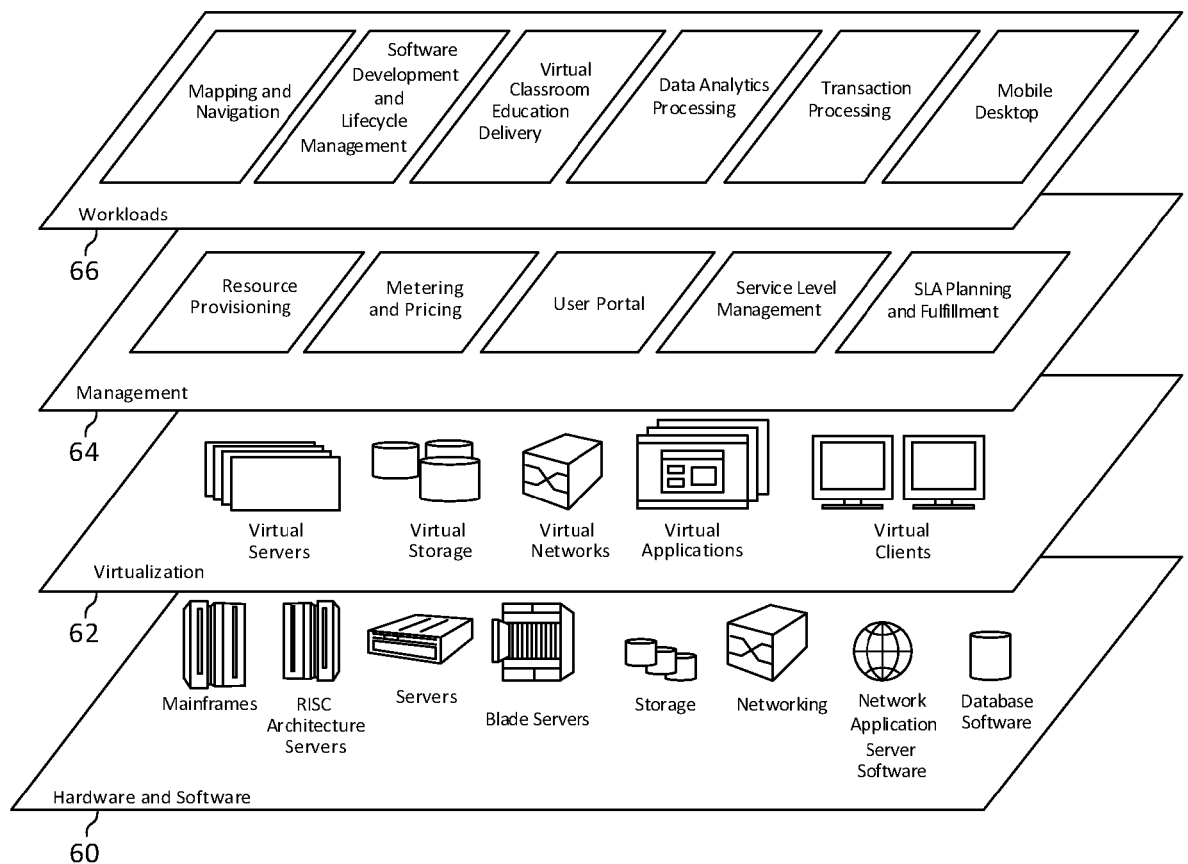
FIG. 3 depicts abstraction model layers according to an embodiment of the present invention

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
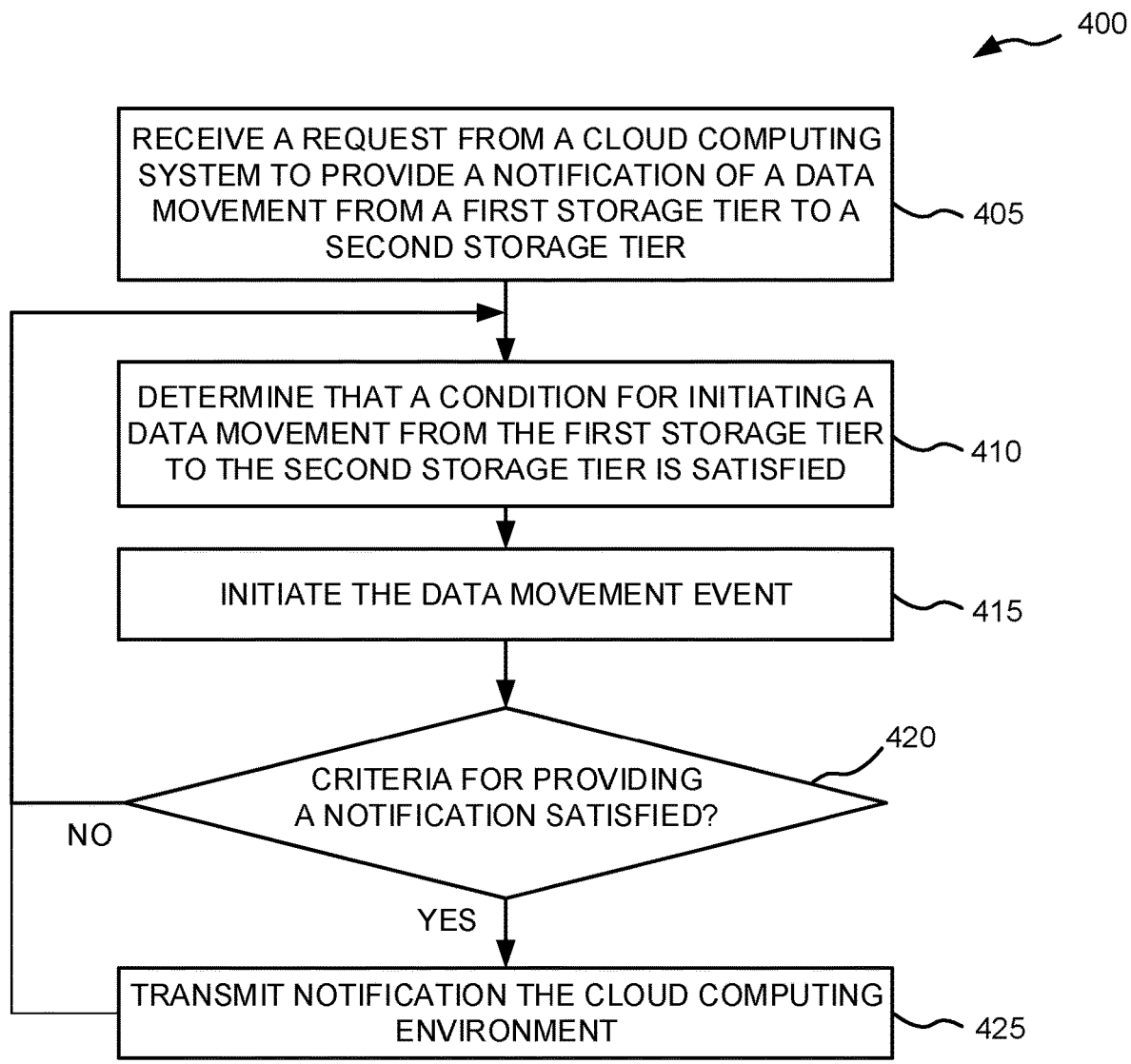
FIG. 4 depicts a set of operations to enable management of cloud resources based on tiered storage data movement, according to various embodiments.
Figure 7:
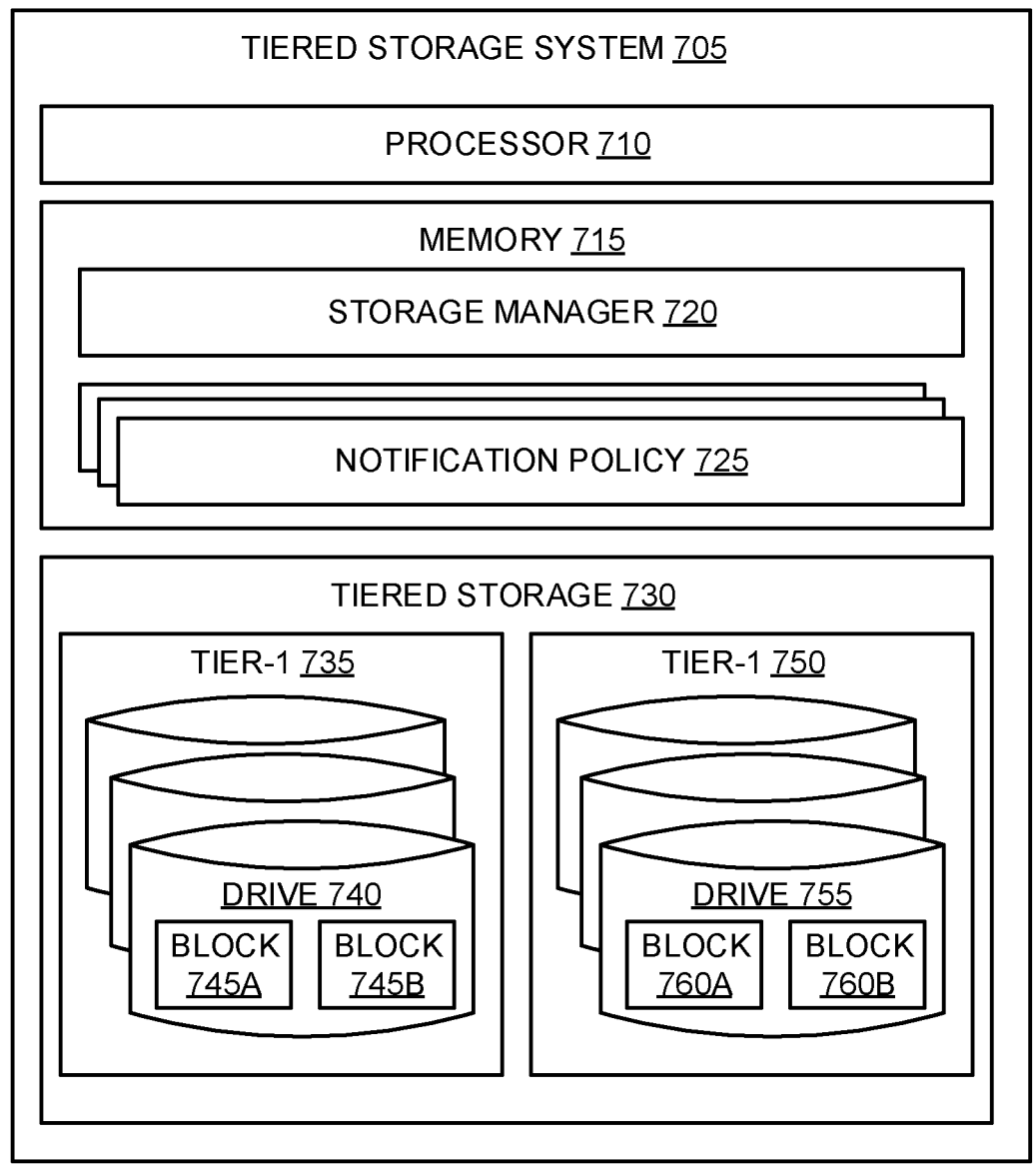
FIG. 7 depicts a block diagram of an example tiered storage system 705, according to various embodiments.

Referring now to the figures, FIG. 4 depicts a set of operations 400 to enable management of cloud resources based on tiered storage data movement, according to various embodiments. The operations 400 can be executed by a tiered storage system, such as the tiered storage system 705 (FIG. 7). In some embodiments, the operations 400 can be automatically executed by a storage manager application of the tiered storage system in accordance with feedback provided by hardware and other software components of the tiered storage system. The storage manager can include computer executable code that is executable by a computing system, such as such as computer system 12 (FIG. 1). In some embodiments the computing system may be a hardware component (e.g., a tiered storage server) associated with layer 60 of the cloud computing system shown in FIG. 3. In certain embodiments, the computing system (e.g., the tiered storage system) is separate from the cloud computing system.

The tiered storage system can execute operation 405 to receive a request from a cloud computing system to provide data movement notifications for data blocks associated with the cloud computing system. The cloud computing system can be a tenant of the tiered storage system and can be allocated one or more data blocks of storage on the tiered storage system. In some embodiments, the request is received through a storage driver. In other embodiments, the request can be received in data packets over communication channel (e.g., a communication cable, a bus, a data communication network, etc.) coupling the tiered storage system to the cloud computing system. The request can be embodied in a data structure, extractable from the data packets by a storage manager associated with the tiered computing system.

In some embodiments, a tiered storage system has two or more storage tiers. A storage tier is a storage resource (e.g., storage volumes and communication hardware and software) having particular performance characteristics that differentiates it from another storage resource or storage tier. A first storage tier, for example, can have greater input/output (I/O) throughput, more storage capacity, or greater communication bandwidth than a second storage tier. A storage system can move data from one storage tier to another storage tier to, for example, optimize for costs, performance, and storage space. A data movement can include moving data associated with the cloud computing system (e.g., data blocks allocated to the cloud computing system) from, for example, a first storage tier to a second storage tier.

In some embodiments, a tiered storage system can be automatically triggered to initiate a data movement in response to a set of triggering conditions (hereinafter, conditions). A triggering condition can any event or condition associated with a storage tier or a tenant of the tiered storage system. A triggering condition, for example, can be an indication that I/O resource (e.g., read/write operations, data bus bandwidth, and stored data) utilization of a storage tier reached or exceeded a threshold utilization level. As another example, a triggering condition can be an indication that the amount of data stored on a storage tier by a tenant (e.g., a cloud computing system) reached or executed a threshold amount. As a third example, a triggering condition can be an indication that a cloud computing system's utilization of the tiered storage system exceeds a subscribed to, or paid for, utilization level.

In certain embodiments, the notification is a data structure generated by the tiered storage system and transmitted to the cloud computing system. The notification can include an indication of the condition (e.g., the triggering condition) that caused the storage system to initiate the data movement. The notification can further indicate the blocks, storage tiers, and the changes in storage performance level, associated with the data movement.

In some embodiments, the request received in operation 405 can include a criteria (e.g., a policy) for causing the tiered storage system to provide a data movement notification. The criteria can be based on the data movement and the condition triggering the data movement. The criteria, for example, can cause the tiered storage system to provide a data movement notification when the tiered storage system initiates a data movement from a first storage tier having a first performance level to a second storage tier having a second performance level, when the second performance level is lower than the first performance level (e.g., a data movement that moves data from a fast storage tier to a slower storage tier). As another example, the criteria can cause the tiered storage system to provide a data movement notification when the tiered storage system initiates a data movement in response to the number of I/O operations processed by the storage tier (e.g., on the behalf of the cloud computing system) exceeding a threshold number of I/O operations (this information could be used by the cloud computing system for billing purposes).

The criteria can also be based on aggregate characteristics of data movements initiated by the tiered storage system. An example of an aggregate characteristic include the frequency of data movements from a storage tier having a first performance level to a storage tier having a second performance level, where the second performance level is lower than the first performance level. Another example of aggregate performance characteristics is a frequency, or count, of data movements from a storage tier in response to determining that the storage tier has insufficient storage capacity or I/O bandwidth. Other individual or aggregate criteria for causing the tiered storage system to provide data movement notifications can be used with the techniques described herein.

The tiered storage system can execute operation 410 to determine whether a condition for initiating a data movement from a first storage tier to a second storage tier is satisfied. Executing operation 410 can include querying a storage controller associated with a storage tier to determine, for example, the amount of storage space available on the storage tier and the I/O utilization rate of the storage tier. Executing operations 410 can also include monitoring and logging I/O operations or transactions executed by a storage tier to evaluate, for example, aggregate triggering conditions or to evaluate tenant based conditions (e.g., conditions that are triggered in response to tenant actions, such as I/O requests from a tenant exceeding a threshold number of requests).

In some embodiments, information queried or monitored in while executing of operation 110 can be logged in a data structure for use in evaluating conditions for providing data movement notifications, as described herein.

The tiered storage system can execute operation 415 to initiate a data movement event in response to determining that a condition for initiating a data movement from a first storage tier to a second storage tier was satisfied. Initiating a data movement can include selecting and transferring one or more blocks of data from a first storage tier to a second storage tier. Initiating a data movement can further include storing in a data structure information associated with the data movement, including, for example, the source tier, the destination tier, the triggering condition, the data blocks moved, and tenants affected by the data movement.

In some embodiments, the tiered storage system can execute operation 420 to determine whether a criteria (e.g., a data movement notification criteria) for providing a notification to a cloud computing system is satisfied. Executing operation 420 can include identifying a cloud computing system affected by the data movement initiated in operation 415. Executing operation 420 can further include evaluating a data movement notification criteria received from the identified cloud computing system in operations 405 using logged data movement information, as described herein. Evaluating the data movement notification criteria can include calculating one or more statistics concerning the data movement information and executing one or more logical operations using the statistics and, for example, threshold values associated with the movement notification criteria. The tiered storage system can return to operation 410 in response determining that the criteria was not satisfied, while the tiered storage system can continue to operation 425 in response to determining that the criteria is satisfied.

The storage system can execute operation 425 to transmit a notification to the cloud computing system. Executing operation 425 can include generating a data structure having, for example, an indication of data blocks moved, a condition or reason for initiating the data movement, and information associated with performance of the storage tiers involved in the data movement. Executing operation 425 can further include executing one or more operations to transmit the notification over a communication channel to the cloud computing system.

Figure 5:
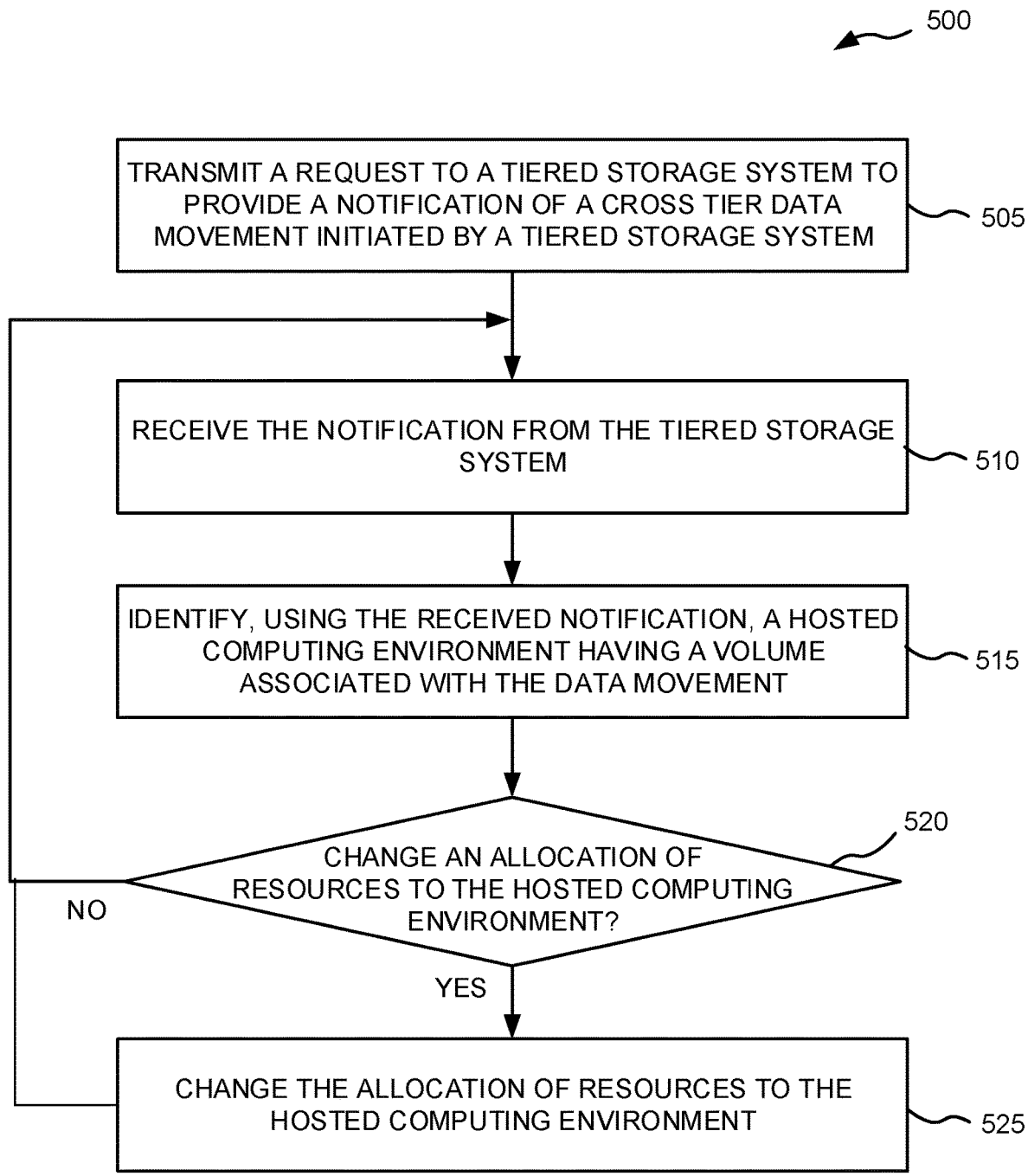
FIG. 5 depicts a set of operations for allocating cloud resources in a cloud computing system based on tiered storage data movement, according to various embodiments.

FIG. 5 depicts a set of operations 500 for allocating cloud resources in a cloud computing system based on tiered storage data movement, according to various embodiments.

Figure 8:
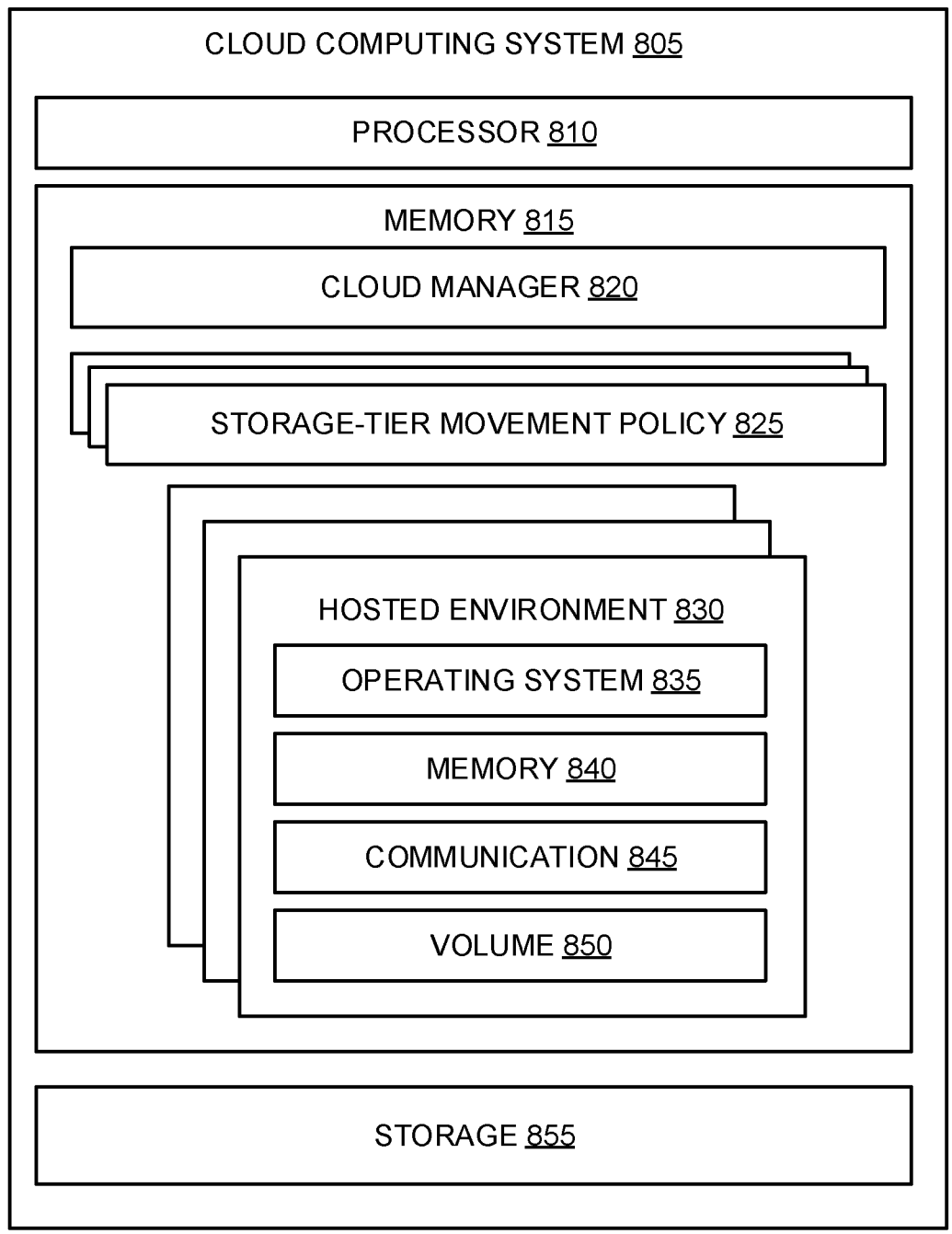
FIG. 8 depicts a block diagram of an example cloud computing system, according to various embodiments.

The operations 500 can be executed by a cloud computing system, such as the cloud computing system 805 (FIG. 8). In some embodiments, the operations 500 can be automatically executed by a cloud manager application of the cloud computing system. The cloud manager can include code that is executable by a computing system, such as such as computer system 12 (FIG. 1). In some embodiments the cloud manager is a software component associated with layer 64 of the cloud computing system shown in FIG. 3.

The cloud computing system can execute operation 505 to transmit a request to a tiered storage system to provide a notification of a data movement initiated by a tiered storage system. A data movement can include moving data associated with the cloud computing system (e.g., data blocks allocated to the cloud computing system) from, for example, a first storage tier to a second storage tier, as described herein. The notification can be a data structure generated by the tiered storage system and transmitted to the cloud computing system, as described herein. In some embodiments, the request includes a criteria for causing the tiered storage system to provide a data movement notification. The characteristics of the criteria are consistent with the criteria described in the discussion of the operations 400 (FIG. 4). Executing operation 505 can include generating a data structure having the request and transmitting the data structure to the tiered storage system over a communication channel.

The cloud computing system can execute operations 510 to receive a notification (e.g., a data movement notification) from the tiered storage system. The notification can be received in data packets from a communication channel coupling the tiered storage system to the cloud computing system. The notification can be embodied in a data structure, extractable from the data packets by, for example, the cloud manager. The notification can include an indication of blocks moved, a condition or reason for initiating the data movement, and information associated with performance of the storage tiers involved in the data movement, as described herein.

The cloud computing system can execute operation 515 to identify, using the received notification, a hosted computing environment having a virtual volume associated with the data movement. Executing operation 515 includes determining, from the notification, one or more blocks of data associated with the data movement operation. Executing operation 515 can then include determining from, for example, a data structure mapping blocks of the cloud computing system's logical volume to one or more virtual volumes allocated to hosted computing environment, a hosted computing environment having a virtual volume associated with the one or more blocks indicated in received notification.

The cloud computing system can execute operation 520 to determine whether to change an allocation of resources to the identified hosted computing environment. Executing operation 520 can include determining from a data structure storing storage-tier movement policies whether to change the allocation of resources to the hosted computing environment. In some embodiments, the storage-tier movement policies can indicate conditions or criteria for changing allocation of resources to one or more hosted computing environments in response to a tiered storage data movements. In some embodiments the conditions or criteria can be substantially the same as the criteria for causing the tiered storage system to transmit a data movement notification. The cloud computing system can return to operation 510 in response to determining not to change an allocation of resources to the identified hosted computing environment, while the cloud computing system can continue to operation 525 in response to determining to change an allocation of resources to the identified hosted computing environment.

The cloud manager can execute operation 525 to change the allocation of resources to the hosted computing environment in response to determining to change the allocation of resources to the hosted computing environment. In some embodiments, the resources allocated to the host computing environment can include at least one of allocated memory, a processing resource, and communication resource (e.g., communication bandwidth). Changing the allocation of resources can include moving the identified hosted computing environment from a first host computing system to a second host computing system in a cloud computing system. Changing the allocation of resources also include suspending execution of the identified hosted computing environment. In some embodiments, changing the allocation of resources includes notifying a user associated with the hosted computing environment to cause the user to change the allocation of resources. In some embodiments, changing the allocation of resources includes notifying a service associated with the identified hosted computing environment to cause the service to change the allocation of resources. In other embodiments, the allocation of one or more other resources can be changed according to other stored storage-tier movement policies.

Figure 6:
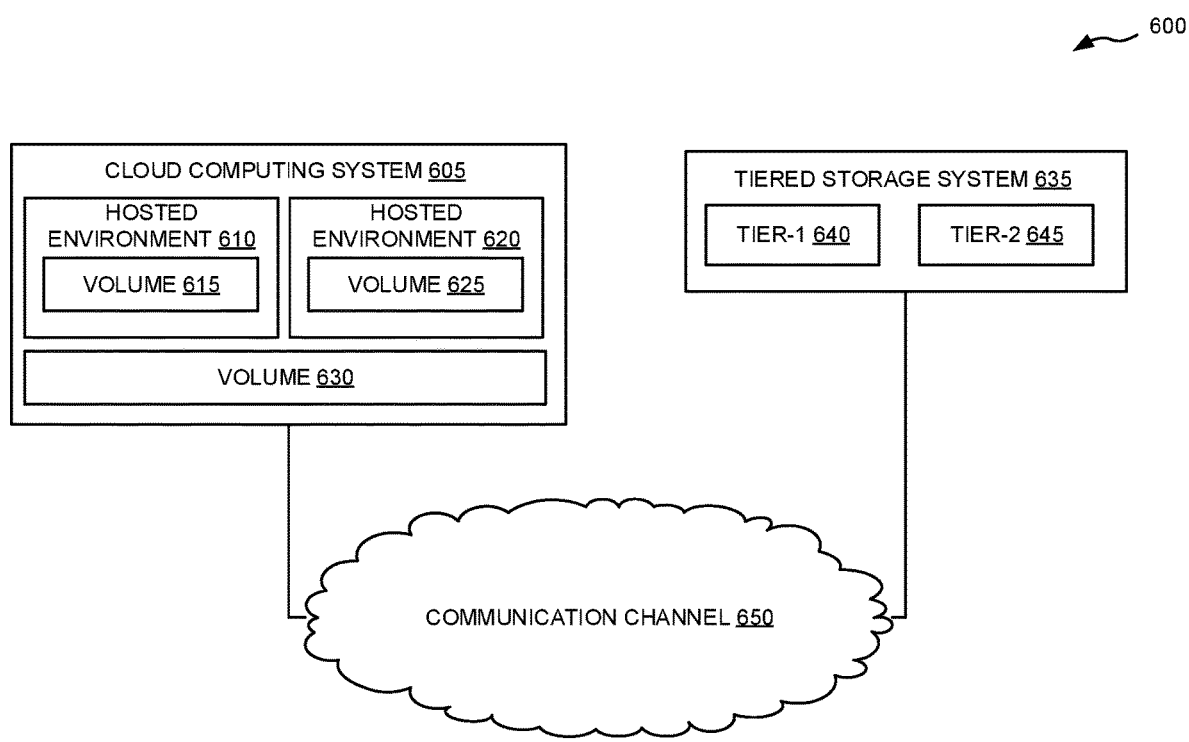
FIG. 6 depicts a block diagram of an example cloud computing environment using tiered storage, according to various embodiments.

FIG. 6 depicts a block diagram of an example cloud computing environment 600 using tiered storage, according to various embodiments. The cloud computing environment 600 includes cloud computing system 605 coupled to tiered storage system 635 using communication channel 650.

In some embodiments, the cloud computing system 605 includes one or more computing systems executing software and firmware applications to enable, or host, hosted computing environment 610 and hosted computing environment 620, as described herein. The cloud computing system 605 can also include volume 630 (e.g., a logical volume), having one or more blocks allocated to virtual volume 615 of hosted computing environment 610 and virtual volume 625 of hosted computing environment 620. All or a portion of volume 630 can be stored on tiered storage system 635 on storage tier-1 640 or storage tier-2 645, as described herein.

In some embodiments, the communication channel 650 can be data bus, a communication cable, or a data communication network, configured to transfer data in one or more data structures or packets between cloud computing system 605 and tiered storage system 635.

FIG. 7 depicts a block diagram of an example tiered storage system 705, according to various embodiments. The tiered storage system 705 can include processor 710, memory 715, and tiered storage 730. The memory 715 can include storage manger 720 and notification policy 725. The storage manager 720 can execute on the processor 710 to implement the operations and techniques described herein. Notification policy 725 can include data movement notification requests from registered tenants (e.g., cloud computing systems that submit data movement notification requests). The requests can include criteria for causing the tiered storage system 705 provide data movement notifications, as described herein. Tiered storage 730 can include storage tier-1 735 and storage tier-2 750. Storage tier-1 735 can have a performance level or rating, and can include one or more storage drives (e.g., disk drives, solid state drives, etc.) storing data block 745A and 745B. Storage tier-2 750 can have another performance level or rating, and can include one or more storage drives storing data block 760A and 760B.

FIG. 8 depicts a block diagram of an example cloud computing system 800, according to various embodiments. The tiered cloud computing system 805 can include processor 810, memory 815, and tiered storage 855 (e.g., a logical volume). The memory 815 can include cloud manger 820, storage-tier movement policies 825, and hosted computing environments 830. The storage manager 820 can execute on the processor 810 to implement the operations and techniques described herein. The hosted computing environments 830 can include operating system 835 and allocated resources such as memory 840, communication resources 845, and virtual volume 850.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for enabling management of cloud resources based on tiered storage data movement, the method comprising:
   receiving a request from a cloud computing system to provide the cloud computing system a notification of a data movement initiated by a tiered storage system, wherein:
     the request contains a plurality of criteria including the data movement direction and the frequency of data movement from a storage tier having a first performance level to a storage tier having a second performance level,
     the data movement comprises moving data associated with the cloud computing system from a first storage tier to a second storage tier,
     the notification comprises a first indication of a condition for initiating the data movement, and
     the condition comprises a second indication that a utilization of the tiered storage system exceeds a subscribed utilization level;
   determining that the condition for initiating the data movement was satisfied;
   initiating the data movement in response to determining that the condition was satisfied;
   transmitting the notification in response to initiating the data movement;
   identifying, based on the initiating, a hosted computing environment having a volume associated with the data movement; and
   changing an allocation of resources to the hosted computing environment such that the utilization does not exceed the subscribed utilization level.

2. The method of claim 1 further comprising:
   providing the amount of storage space available on the first storage tier and the I/O utilization rate of the first storage tier; and
   providing the amount of storage space available on the second storage tier and the I/O utilization rate of the second storage tier,
     wherein the first storage tier has a performance level different from a performance level of the second storage tier,
     wherein the first storage tier has a I/O utilization rate different from a I/O utilization rate of the second storage tier, and wherein the first storage tier has less storage space available than the second storage tier.

3. The method of claim 1, wherein the request includes a first criteria for providing the notification, and wherein the notification is further transmitted in response to determining that the first criteria is satisfied.

4. The method of claim 3, wherein the first criteria is based on at least one of the data movement direction and the condition.

5. The method of claim 3, wherein the first criteria is based on aggregate characteristics of data movements initiated by the tiered storage system.

6. The method of claim 5, wherein the aggregate characteristics is a frequency of data movements from a storage tier in response to determining that the storage tier has insufficient storage capacity.

7. The method of claim 1, wherein the data associated with the cloud computing system is a virtual volume allocated to a hosted computing environment.

8. The method of claim 1, wherein the condition is at least one of:
an input/output resource utilization of a storage tier reaching a threshold level,
an amount of data associated with the cloud computing system reaching a threshold amount, and
an amount of data stored on the first tier reaching a threshold level.

9. A system for enabling management of cloud resources based on tiered storage data movement, the system comprising:
one or more computing nodes having a memory and a processor; and
a non-transitory computer readable storage medium of the one or more computing nodes having program instructions embodied therewith, the program instructions executable by the processor to cause the system to:
receive a request from a cloud computing system to provide the cloud computing system a notification of a data movement initiated by a tiered storage system, wherein:
the request contains a plurality of criteria including the data movement direction and the frequency of data movement from a storage tier having a first performance level to a storage tier having a second performance level,
the data movement comprises moving data associated with the cloud computing system from a first storage tier to a second storage tier,
the notification comprises a first indication of a condition for initiating the data movement, and
the condition comprises a second indication that a utilization of the tiered storage system exceeds a subscribed utilization level;
determine that the condition for initiating the data movement was satisfied;
initiate the data movement in response to determining that the condition was satisfied;
transmit the notification in response to initiating the data movement;
identify, based on the initiating, a hosted computing environment having a volume associated with the data movement; and
change an allocation of resources to the hosted computing environment such that the utilization does not exceed the subscribed utilization level.

10. The system of claim 9, wherein the first storage tier has a performance level different from a performance level of the second storage tier.

11. The system of claim 9, wherein the request includes a first criteria for providing the notification, and wherein program instructions are further executable by the processor to cause the system to the transmit the notification in response to determining that the first criteria is satisfied.

12. The system of claim 11, wherein the first criteria is based on at least one of the data movement direction and the condition.

13. The system of claim 11, wherein the first criteria is based on aggregate characteristics of data movements initiated by the tiered storage system.

14. The system of claim 13, wherein the aggregate characteristics is a frequency of data movements from a storage tier in response to determining that the storage tier has insufficient storage capacity.

15. The system of claim 9, wherein the data associated with the cloud computing system is a virtual volume allocated to a hosted computing environment.

16. The system of claim 9, wherein the condition is at least one of:
an input/output resource utilization of a storage tier reaching a threshold level,
an amount of data associated with the cloud computing system reaching a threshold amount, and
an amount of data stored on the first tier reaching a threshold level.

17. A computer program product for enabling management of cloud resources based on tiered storage data movement, the computer program product including a computer readable storage medium having program instructions embodied therewith, wherein the computer readable storage medium is not a transitory signal per se, the program instructions executable by a processing circuit to cause the processing circuit to perform a method comprising:
receiving a request from a cloud computing system to provide the cloud computing system a notification of a data movement initiated by a tiered storage system, wherein:
the request contains a plurality of criteria including the data movement direction and the frequency of data movement from a storage tier having a first performance level to a storage tier having a second performance level,
the data movement comprises moving data associated with the cloud computing system from a first storage tier to a second storage tier,
the notification comprises a first indication of a condition for initiating the data movement, and
the condition comprises a second indication that a utilization of the tiered storage system exceeds a subscribed utilization level;
determining that the condition for initiating the data movement was satisfied;
initiating the data movement in response to determining that the condition was satisfied;
transmitting the notification in response to initiating the data movement;
identifying, based on the initiating, a hosted computing environment having a volume associated with the data movement; and
changing an allocation of resources to the hosted computing environment such that the utilization does not exceed the subscribed utilization level.

18. The computer program product of claim 17, wherein the request includes a first criteria for providing the notification, and wherein the notification is further transmitted in response to determining that the first criteria is satisfied.

\* \* \* \* \*